Patented June 25, 1929.

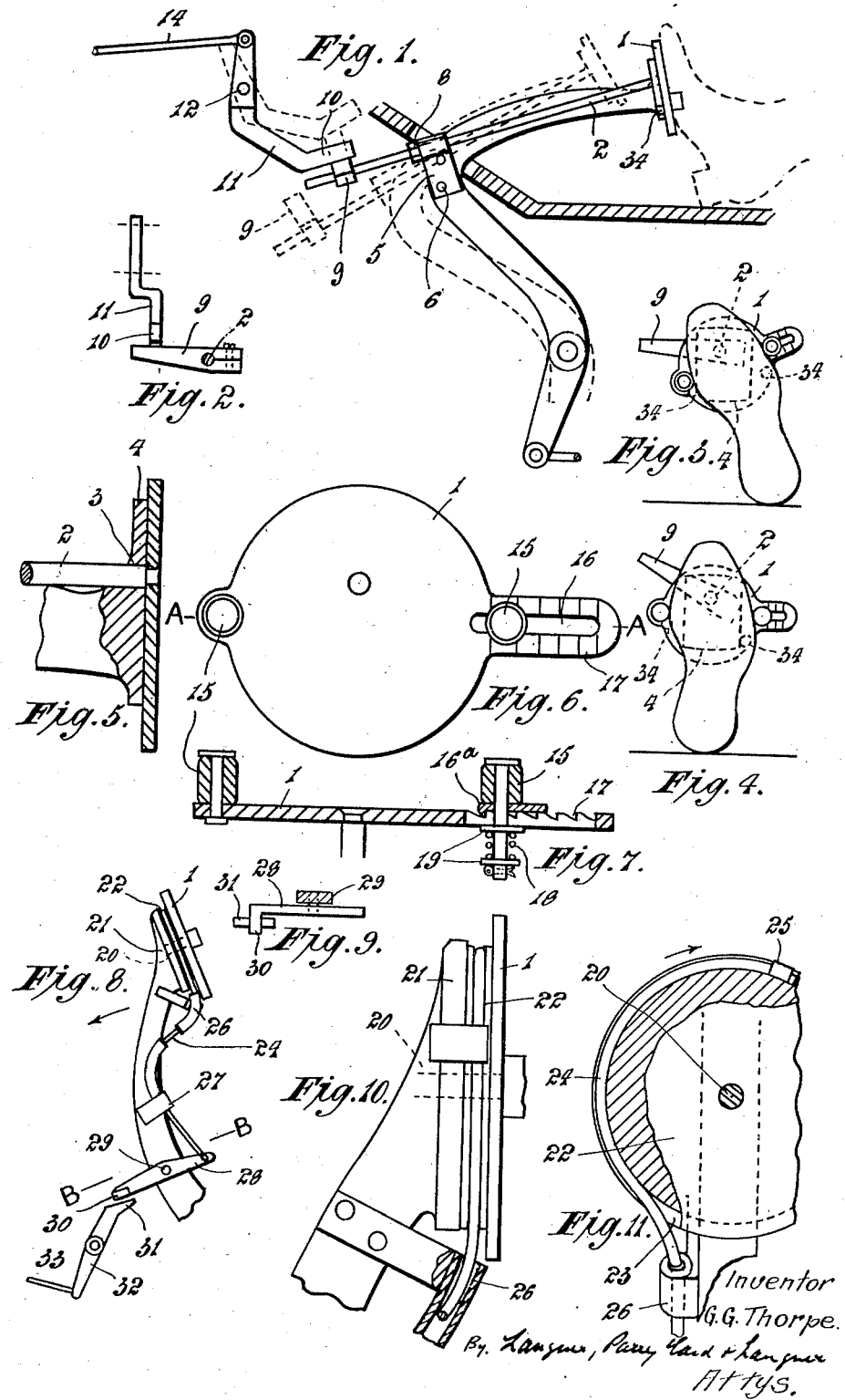

1,718,884

UNITED STATES PATENT OFFICE.

GEORGE GORDON THORPE, OF WANGANUI, NEW ZEALAND, ASSIGNOR OF ONE-HALF TO JOHN COULL, OF WANGANUI, NEW ZEALAND.

PEDAL CONTROL FOR MOTOR VEHICLES.

Application filed December 2, 1926, Serial No. 152,281, and in New Zealand September 28, 1926.

This invention relates to pedal controls for motor vehicles.

According to the present invention there is combined with the brake pedal mechanism adapted to be actuated by the movement of the driver's foot other than by a forward movement, and this movement of the foot operates to open or close the throttle as required but to be inoperative upon forward movement of the foot or pedal. A foot controlled member is attached to the brake pedal and receives the driver's foot for operating both brake pedal and the throttle control. This member actuates means which, when the foot is moved either in a lateral or rotary manner, will operate the throttle control to open or close such throttle, but which, when the brake pedal is pushed forward, will move out of engagement with the throttle control.

The present invention will, therefore, avoid the danger of the driver placing his foot on the wrong pedal and thus eliminate the possibility of accident due to the driver in an emergency opening the throttle instead of operating the brake, or vice versa.

It will give safer driving, inasmuch as the driver's foot will remain constantly upon the brake pedal, so that the brake can be applied instantaneously.

It will also prevent involuntary operations of the throttle due to shocks over bad roads, and so provide smoother running on such roads, and at the same time tend to reduce strains on the transmission mechanism.

Driving fatigue will be reduced, since the driver's foot rests upon the brake pedal and no muscular tension is necessary to maintain a constant pressure on the throttle control.

The driver, where necessary, can accelerate one moment and apply the brake at the next moment without removing his foot from the one pedal.

Approved forms of the invention are illustrated in the accompanying drawings, wherein:—

Figure 1, is a side view showing the invention in conjunction with one form of brake pedal.

Figure 2, is an end view of a portion thereof.

Figure 3, is an end view of the foot controlled member showing it in one position.

Figure 4, is a similar view showing the member operated to another position.

Figure 5, is a cross section through a part of a pedal, but drawn to a larger scale than the preceding views.

Figure 6, is a front view of the member, and

Figure 7, is a cross section on line A—A Figure 6.

Figure 8, is a side view showing the invention applied to another form of pedal.

Figure 9, is a plan on line B—B, Figure 8.

Figure 10, is an enlarged side view of the pedal shown in Figure 8, and

Figure 11, is a front view partly in section.

Referring to the drawings, and first to Figures 1 to 7, a member consisting of a plate 1 is adapted to be operated by the driver's foot and is fixed on the end of a rod 2 which passes through a hole 3 in the pedal 4 (see Figure 5). The rod 2 passes along the side of the pedal as shown in Figure 1, and is guided through a bracket 5 fixed by rivets to the pedal and secured by a shoulder or nut 8. On the rod is rigidly secured an arm 9 adapted to engage beneath a portion 10 of a lever 11 pivoted at 12. To the other end of the lever 11 is attached a rod 14 controlling the throttle from the carburettor in any ordinary manner.

The plate 1 may have stops 15 upon each side between which the driver's foot is placed, so as to enable the plate to be easily operated. In Figures 6 and 7 one of the stops is made adjustable to accommodate different sizes of feet, and in this case the pin of the stop passes through a slot 16, a portion of the plate each side of the slot having teeth 17 into which a tooth of a plate 16ª enters, the stop being held down by a spring 18 in compression between washers 19 on the spindle of the stop. Limiting stops 34 may also be used.

Figures 1 and 3 show the plate 1 in the position when the throttle is not being operated by the rod 14, the arm 9 merely resting beneath the lever 11 which is held in that position by the spring of the throttle control. Upon the driver moving his foot to the position shown in Figure 4, the lever 9 will move upwards as shown and raise the lever 11 to the position shown in dotted lines in Figure 1, thereby opening the throttle. Any intermediate position of the throttle may be obtained by any intermediate position of the foot between that shown in Figure 3 and in Figure 4. The length of the portion 10 on the lever 11 is such that with any slight forward movement of the pedal 4 the arm 9 would still be in contact and operate the lever, but should the brake pedal be pushed forward for the purpose of applying the brake, the arm 9 would leave the lever 11, as shown in dotted lines in Figure 1 and be completely disengaged from the lever, even though the arm 9 is rotated to the position as in Figure 4, so that the throttle will not be operated by the rod 14 when the brake is applied.

If desired, the movement of the foot may give a different actuation, e. g. the position in Figure 3 may operate the lever 11 and the position in Figure 4 may be a normal idle position.

Referring now to Figures 8 to 11, the plate is pivoted on a pin 20 fixed in the pedal tread 21. The plate 1 contains a drum 22 on its underside having a groove 23 in which rides a wire 24. This wire is fixed at 25 to the drum and after passing around the drum a sufficient distance is guided through a bracket 26 fixed to the pedal and through a further bracket 27 and has its end attached to a lever 28 pivoted at 29 to the shank of the pedal. The end of the lever 28 is formed with a lateral arm 30 (see Figure 9) adapted to contact with a foot 31 of a lever 32 to which is attached a rod 33 leading to the throttle. Upon the plate 1 being rotated by means of the driver's foot in the direction indicated by the arrow in Figure 11, the lever 28 will be drawn upwards and depress the foot 31 of the lever 32 for the purpose of opening the throttle. When, however, the brake pedal is pushed forward in the direction of the arrow in Figure 8, the arm 30 will ride over the foot 31 and be clear of the foot so that upon the pedal being operated for the purpose of applying the brake the throttle cannot be operated by the rod 33.

In some cases, the pedals may be specially constructed to receive the mechanism, and it is to be understood that I do not limit myself to the specific forms shown in the drawings.

What I claim is:—

1. In pedal control for motor vehicles, a brake-pedal extending to a position for actuation by the driver's foot, a foot-plate rotatably pivoted on the tread of said brake-pedal, a lever pivoted on said brake-pedal, a drum fixed on the underside of said foot-plate, a wire passing around said drum and guided to one end of said lever on said brake-pedal, a lever controlling the throttle of the engine operable by the other end of said lever on the brake-pedal and adapted upon forward actuation of said pedal to move to a nonoperable position relative to said lever controlling the throttle.

2. In a pedal control for motor vehicles, the combination with the brake pedal, of a foot plate pivoted thereon for rotative adjustment, a drum rotatable, with the foot plate, a lever mounted upon the shank of the brake lever, a flexible connecting element connected to one end of said lever and wound about the drum, whereby the lever may be actuated through rotative adjustment of the foot plate and corresponding adjustment of the drum, a projection upon the other end of said lever, a lever having one end positioned for engagement by said projection upon the first mentioned lever, when the foot pedal is in release position, and means for connection with the throttle of the motor vehicle engine and connected with the other end of the second mentioned lever, the projection of the first mentioned lever being positioned to clear the first mentioned end of the second mentioned lever when the brake pedal is shifted to active position.

In testimony whereof, I have signed my name to this specification.

GEORGE GORDON THORPE.